US012304844B2

(12) United States Patent
Jin et al.

(10) Patent No.: US 12,304,844 B2
(45) Date of Patent: May 20, 2025

(54) METHOD FOR ADVANCED BIOELECTROCHEMICAL TREATMENT OF POLLUTANTS

(71) Applicant: Advanced Environmental Technologies, LLC, Fort Collins, CO (US)

(72) Inventors: Song Jin, Fort Collins, CO (US); Paul H. Fallgren, Fort Collins, CO (US); Kylan S. Jin, Fort Collins, CO (US)

(73) Assignee: Advanced Environmental Technologies, LLC, Fort Collins, CO (US)

( * ) Notice: Subject to any disclaimer, the term of this patent is extended or adjusted under 35 U.S.C. 154(b) by 553 days.

(21) Appl. No.: 16/171,106

(22) Filed: Oct. 25, 2018

(65) Prior Publication Data

US 2019/0119133 A1    Apr. 25, 2019

Related U.S. Application Data

(60) Provisional application No. 62/576,724, filed on Oct. 25, 2017.

(51) Int. Cl.
*C02F 3/00* (2023.01)
*C02F 3/10* (2023.01)
*C02F 3/06* (2023.01)

(52) U.S. Cl.
CPC ............ *C02F 3/005* (2013.01); *C02F 3/105* (2013.01); *C02F 3/109* (2013.01); *C02F 3/06* (2013.01);

(Continued)

(58) Field of Classification Search
CPC ............... C02F 2103/06; C02F 3/005; C02F 2001/46123; C02F 2001/46138;

(Continued)

(56) References Cited

U.S. PATENT DOCUMENTS 5,868,941 A * 2/1999 Gillham .............. B09C 1/085
                                                            205/745
7,858,243 B2   12/2010 Jin et al.

(Continued)

FOREIGN PATENT DOCUMENTS

WO   WO-2008059331 A2 *  5/2008 .......... H01M 8/0263
WO   WO-2011011829 A1 *  2/2011 .............. H01M 8/16

OTHER PUBLICATIONS

Battery University, Building Blocks of a Batter, Jan. 23, 2015, p. 1-4 (Year: 2015).*

(Continued)

*Primary Examiner* — Chester T Barry
(74) *Attorney, Agent, or Firm* — Santangelo Law Offices, P.C.

(57) ABSTRACT

The aspects of embodiments of the invention relate to advanced bioelectrochemical systems. More specifically, the invention relates to the utilization of a power source such as, but not limited to, photo-active, semiconducting materials, batteries, or the like integrated with bioelectrochemical systems perhaps to increase oxidation and/or reduction reactions, which can be applied to the treatment of pollutants environmental media such as but not limited to water, wastewater, soil, and other water-containing environment.

17 Claims, 12 Drawing Sheets

(52) U.S. Cl.
CPC ............................ *C02F 2201/009* (2013.01); *C02F 2201/4617* (2013.01); *C02F 2203/006* (2013.01)

(58) Field of Classification Search
CPC ...... C02F 2001/46161; C02F 2201/009; C02F 2201/46115; C02F 2201/4617; C02F 2203/006; C02F 3/06; C02F 3/105; C02F 3/109; C02F 3/301; C02F 9/00; C02F 1/4672; C02F 3/00; C02F 1/461; C02F 9/14; C02F 2103/002; C02F 2103/005; C02F 2305/10; C02F 1/725; C02F 2001/46142; C02F 2201/4611; C02F 1/283; C02F 1/30; C02F 1/32; C02F 1/325; C02F 1/444; C02F 1/46109; C02F 1/46114; C02F 1/4674; C02F 1/4676; C02F 2001/007; C02F 2001/46133; C02F 2001/46157; C02F 2101/006; C02F 2101/30; C02F 2103/00; C02F 2201/008; C02F 2201/4612; C02F 2201/46135; C02F 2201/46165; C02F 2209/005; C02F 2209/29; C02F 2301/08; C02F 2303/10; C02F 3/1273; C02F 3/28; C02F 3/2826; C02F 3/345; H01M 8/16; H01M 2008/1095; H01M 4/9016; Y02E 60/50; Y02E 60/527; Y02W 10/37; Y02W 10/10; B09C 1/002; B09C 1/085; B09C 1/10; B09C 2101/00; Y02A 20/212
See application file for complete search history.

(56) References Cited

U.S. PATENT DOCUMENTS

| | | | |
|---|---|---|---|
| 9,045,354 B2 | 6/2015 | Jin et al. | |
| 2009/0029198 A1* | 1/2009 | Jin | H01M 8/16 429/401 |
| 2012/0070696 A1* | 3/2012 | Jin | C02F 3/301 205/687 |
| 2013/0299400 A1* | 11/2013 | Silver | C02F 1/46109 210/150 |
| 2014/0209479 A1* | 7/2014 | Hoffmann | C02F 1/4674 205/743 |
| 2015/0068906 A1* | 3/2015 | Curran | C25D 11/026 205/50 |
| 2015/0353386 A1 | 12/2015 | Jin et al. | |
| 2015/0353393 A1* | 12/2015 | Adams | C02F 3/005 210/632 |
| 2016/0064758 A1* | 3/2016 | Lalman | H01M 8/06 429/2 |
| 2016/0326031 A1* | 11/2016 | Amy | C02F 3/005 |
| 2018/0230028 A1* | 8/2018 | Li | C02F 1/725 |

OTHER PUBLICATIONS

Knier; How do Photovoltaics Work ?; Aug. 6, 2008; p. 1-2 (Year: 2008).*

Bruce E. Logan, et al., Microbial Electrolysis Cells for High Yield Hydrogen Gas Production from Organic Matter, Environmental Science & Technology, vol. 42, No. 23, 11 pages.

Rachel C. Wagner, et al., Hydrogen and methane production from swine wastewater using microbial electrolysis cells, Elsevier, Science Direct, Water Research, www.elsevier.com/locate/watres.com, 9 pages.

Hongrui Ding, et al., Promotion of anodic electron transfer in a microbial fuel cell combined with a silicon solar cell, Elsevier, Science Direct Journal of Power Sources 253 (2014) 177-180, 4 pages.

Anhuai Lu, et al., Microbial Fuel Cell Equipped with a Photocatalytic Rutile-Coated Cathode, Energy Fuels 2010, 24, 1184-1190, 7 pages.

E. S. Heidrich et al., Production of hydrogen from domestic wastewater in a pilot-scale microbial electrolysis cell, Appl. Microbiol. Biotechnol. (2013) 97:6979-6989, Environmental Biotechnology, Received Jul. 19, 2012, 11 pages.

U.S. Appl. No. 62/576,724, filed Oct. 25, 2017. First Named Inventor: Jin.

* cited by examiner

METHOD FOR ADVANCED BIOELECTROCHEMICAL TREATMENT OF POLLUTANTS

This is the U.S. Non-Provisional patent application claiming priority to and the benefit of U.S. Provisional Application No. 62/576,724, filed Oct. 25, 2017, hereby incorporated by reference herein.

BACKGROUND OF INVENTION

In earlier patents, U.S. Pat. Nos. 9,045,354 and 7,858,243, hereby incorporated by reference herein, bioelectrochemical systems could be designed to enhance biological and chemical degradation and transformation of different pollutants in wastewater and different environmental matrices. The application of the bioelectrochemical systems can provide an electron acceptor at a higher oxidation state, perhaps while requiring no energy or even chemical input. The pollutants degradation rates can be increased from about 20% to about 1000%, perhaps depending on the types of pollutants and even the environmental matrices. Bioelectrochemical systems may offer a sustainable remediation technology for treating pollution in water, wastewater, soil, and other water-containing the environment. However, there is a need to increase pollutant degradation beyond these technologies.

Semi-conducting materials can be susceptible to photo-reactions when exposed to certain ranges of visible and/or ultraviolet light. For example, these photo-reactions may involve the release of electrons (e.g., photoelectrons), perhaps resulting in electron-hole pairs in the materials, which may possess a strong potential to be filled (e.g., reduced) and subsequently may result in aggressive oxidation in the surround matrix. The liberation of the photoelectrons to an electron sink, such as electrical circuit or even an acceptor, may leave "holes" in the materials to be filled by electrons from an electron donor.

In the past, such photo-reactions, perhaps as in the form of small silicon solar panels, may be integrated with microbial fuel cells ("MFCs") to enhance electrical power generation in such devices. For example, microbial electrolysis cells may be bioelectrochemical systems that may utilize external electrical sources to promote microbial activity at a cathode for producing hydrogen (and other fuel type products) from organic compounds and water (see, Logan, B. E., Call, D., Cheng, S., Hamelers, H. V. M., Sleutels, T. H. J. A., Jeremiasse, A. W., Rozendal, R. A. 2008. Microbial electrolysis cells for high yield hydrogen gas production from organic matter. Environ. Sci. Technol. 42:8630-8640; Wagner, R. C., Regan, J. M., Oh, S.-E., Zuo, Y., Logan, B. E. 2009. Hydrogen and methane production from swine wastewater using microbial electrolysis cells. Water Res. 43:1480-1488; and Heidrich, E. S., Dolfing, J., Scott, K., Edwards, S. R., Jones, C., Curtis, T. P. 2013. Production of hydrogen from domestic wastewater in a pilot-scale microbial electrolysis cell. Appl. Microbiol. Biotechnol. 97:6979-6989, each hereby incorporated by reference herein). These past systems were not specifically used for treatment of pollutants.

In addition, photocatalytic enhancement of electron transfer within a bioelectrochemical system has been investigated by Lu et al. (Lu, A., Li, Y., Jin, S., Ding, H., Zeng, C., Wang, X., Wang, C. 2010. Microbial fuel cell equipped with a photocatalytic rutile-coated cathode. Energy Fuels 24:1184-1190), hereby incorporated by reference herein. However, the configuration in Lu et. al. has no photocatalytic device in the circuit; rather only a cathodic electrode which may be coated with a photo-active material to promote higher electricity yields. The system was tested for reductive reactions as the cathode to reduce a few compounds that incline to accept electrons. It was not used to treat wastewater for COD removal.

Ding et al. (Hongrui Ding, Yan Li, Anhuai Lu, Xin Wang, Changqiu Wang, 2014. Promotion of anodic electron transfer in a microbial fuel cell combined with a silicon solar cell. Journal of Power Sources, 253: 177-180), hereby incorporated by reference herein, uses a solar cell in the circuit of a MFC to enhance electricity production in a small bottle, with acetate as the sole substrate. However, acetate is highly bioamenable in distilled water and is very different from real world pollutants, including those found in wastewater. An experiment that works on acetate cannot be extrapolated as feasible for much more complicated systems like treatment of wastewater. In addition, testing of the system as described in Ding et al. has shown to not work in the real world. For example, the carbon material anode taught in Ding et al. accumulate too much solids to lose functions and collapsed in field tests. Therefore, the Ding et al. system does not work to treat real-world pollutants.

SUMMARY OF INVENTION

The present invention includes a variety of aspects which may be selected in different combinations and based upon the particular application or needs to be addressed. In one basic form, the invention discloses the use of a power source with bioelectrochemical systems to increase degradation of pollutants. One aspect of the invention may be to integrate semiconducting materials, including surface coated materials like rutile or titanium oxides or commercially available semiconducting devices like silicon solar panels, into the bioelectrochemical systems which may significantly enhance microbial activity and even performance of the bioelectrochemical systems; may create an electropositive potential at the semiconducting location perhaps to enhance oxidation capability at an anode of the bioelectrochemical system and its influenced vicinity; and even increase reductive potential at cathode and its influenced vicinity. A photo-bioelectrochemical system may provide a stand-alone catalyst in a circuit, and may work on the anode perhaps to turn it into an "electron pump" thanks to the electron-hungry holes that may be created when the catalysts may be exposed to light. Another aspect of the invention may be to integrate a battery into a bioelectrochemical system. A battery device may work on the anode side of the system perhaps to expedite electron flow. Yet another aspect of the invention may be to enhance biofilm growth on the anode. The invention may also include aspects to reduce sludge generation which typically occurs in standard wastewater treatment systems. Naturally, as a result of these several different and potentially independent aspects of the invention, the objects of the invention are quite varied.

One of the broad objects of the invention is to provide a process and device for enhancing degradation and transformation of pollutant chemicals in water, wastewater, soil, and other water-containing environmental matrices by powering bioelectrochemical systems with batteries, photo-active and semi-conducting materials, or the like.

Another broad object of the invention is to provide a process and device for enhancing microbial activity and bioconversion rates and oxidizing and reducing potentials by combining power sources such as batteries, photo-active and semi-conducting materials, or the like with bioelectrochemical systems.

It is yet another object of the invention to provide a process and device for expediting electron transfer and boost consequential oxidation and reduction reactions for destructing contaminants in water, wastewater, soil, and other water-containing and environmental matrices by combining power sources such as batteries, photo-active and semi-conducting materials, or the like with bioelectrochemical systems.

Another object of the invention is to provide a process and device for expediting electron transfer in the contaminated matrices, enhancing electrical power generation from the degradation and transformation of pollutant chemicals in water, wastewater, soil, and other water-containing and environmental matrices by combining power sources such as batteries, photo-active and semi-conducting materials, or the like with bioelectrochemical systems.

Naturally, further objects of the invention are disclosed throughout other areas of the specification, figures, and claims.

DETAILED DESCRIPTION OF PREFERRED EMBODIMENTS

Figure 1:
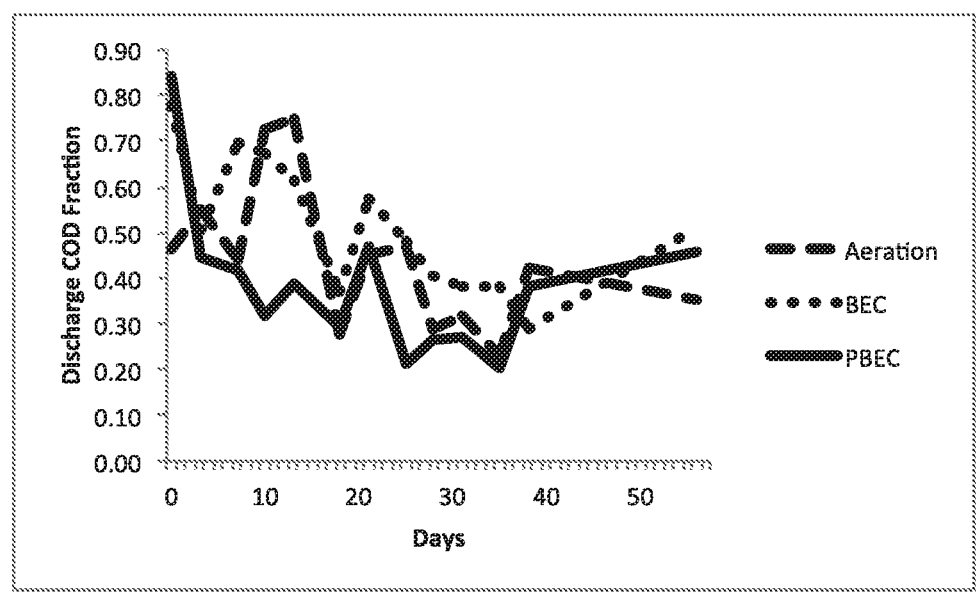
FIG. 1 shows as graph of the chemical oxygen demand concentrations in wastewater that was treated in laboratory-scale reactors.

As mentioned earlier, the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention include methods and devices for decreasing and eliminating pollutants such as chemical concentrations in environmental matrices by integrating and combining a power source with bioelectrochemical systems. In some embodiments, the present invention may provide a method for advanced bioelectrochemical degradation of pollutants comprising the steps of creating at least one anode within an environmental media having at least one contaminant; providing at least one microbial population near said at least one anode; providing a cathode; providing a power source connected to said at least one anode and said cathode; using said power source to increase an electron flow from said at least one anode to said cathode; using said power source to increase oxidation at said at least one anode and reduction at said cathode; facilitating biofilm growth near said at least one anode;

metabolizing said at least one contaminant in said environmental media with said at least one microbial population to generate electrons and protons to be used in said oxidation and reduction; and perhaps even remediatingly biodegrading at least some of said at least one contaminant. Embodiments may also include an advanced bioelectrochemical system comprising at least one anode in an environmental media; at least one microbial population near said at least one anode; at least one contaminant in said environmental media; a cathode; biofilm growth near said at least one anode; a power source connected to said at least one anode and said cathode capable of increasing an electron flow from said at least one anode to said cathode and capable of increasing oxidation at said at least one anode and reduction at said cathode; and perhaps even a reduction of said at least one contaminant.

An advanced bioelectrochemical system (1) for degradation of pollutants may include at least one anode (15) where oxidation occurs, an environmental media (17) that may be contaminated and that may contain at least one microbial population (3), a cathode (14) where reduction occurs, and perhaps even a power source (4) connected to an anode and cathode system. At least one contaminant (2) may include, but is not limited to, pollutant chemicals, petroleum hydrocarbons, volatile organic compounds, semi-volatile organic compounds, ethers, fuel oxygenates, ketones, alcohols, amines, amides, monoaromatic compounds, chlorinated solvents, halogenated hydrocarbons, endocrine disrupting compounds, dioxanes, dioxins, polycyclic aromatic hydrocarbons, polychlorinated biphenyls, chlorobenzenes, phenols, chlorophenols, perfluorinated compounds, chemical oxygen demand, heavy metals, arsenic, selenium, nitrate, perchlorate, carbon dioxide, sulfur oxides, nitrogen oxides, any combination thereof, or the like. The environmental media (17) may include, but is not limited to, water, soil, sediment, groundwater, wastewater, surface water, gravel, coal, peat, fractured rock, air, flue gas, any combination thereof, or the like. The environmental media may be a contaminated source located in the earth or it may be media that has been contained in a system perhaps by removing the media from its natural source to be degraded as an ex situ remediation system. For example, an anode, cathode and power source may be applied to an in situ environmental media perhaps to clean up the contaminated source at its original site. Alternatively, the environmental media may be placed in ex situ advanced bioelectrochemical system.

An environmental media may contain at least one microbial population (3). A microbial population may be naturally located in said environmental media or it may be added to an environmental media. A power source (4) may include, but is not limited to, a semi-conducting material, a photoactive material, a battery, any combination thereof, or the like. A power source may include a wind turbine, solar power source coupled with a battery, a solar power source coupled with a transformer, a solar power source coupled with a rectifier, a solar power source coupled with a DC power supplier, a wind power source coupled with a battery, a wind power source coupled with a transformer, a wind power source coupled with a rectifier, a wind power source coupled with a DC power supplier, any combination thereof, or the like. A power source may be connected to the anode and cathode and may provide power to the system. As may be understood from the non-limiting example of FIG. 3, a power source may provide power to increase an electron flow (5) from an anode (15) to a cathode (14) and may even increase oxidation at an anode and reduction at a cathode. This may then facilitate biofilm (6) growth near or at the anode. Contaminants (13) in an environmental media may be metabolized by at least one microbial population (3), located perhaps near the anode, which may generate electrons (7) and protons (8) to be used in the oxidation and reduction reactions in the system. An advanced bioelectrochemical system may provide maximizing an electron transfer at an anode. Therefore, the contaminants may be remediatingly biodegraded in the system resulting in a reduction of the contaminants.

A power source may provide power to an anode for an amount of time. In some embodiments, a power source may provide continuous power to an anode system. In other embodiments, a power source may be connected to an anode and cathode system for a specific amount of time in which power is provided for a specific amount of time. This may include from about one minute to about one month or more. It may also be intermittently connected or even intermittently providing power. For example, when using solar power, the system may quit when sunlight fades and when using a battery, the system may quit when the battery is drained.

Figure 3:
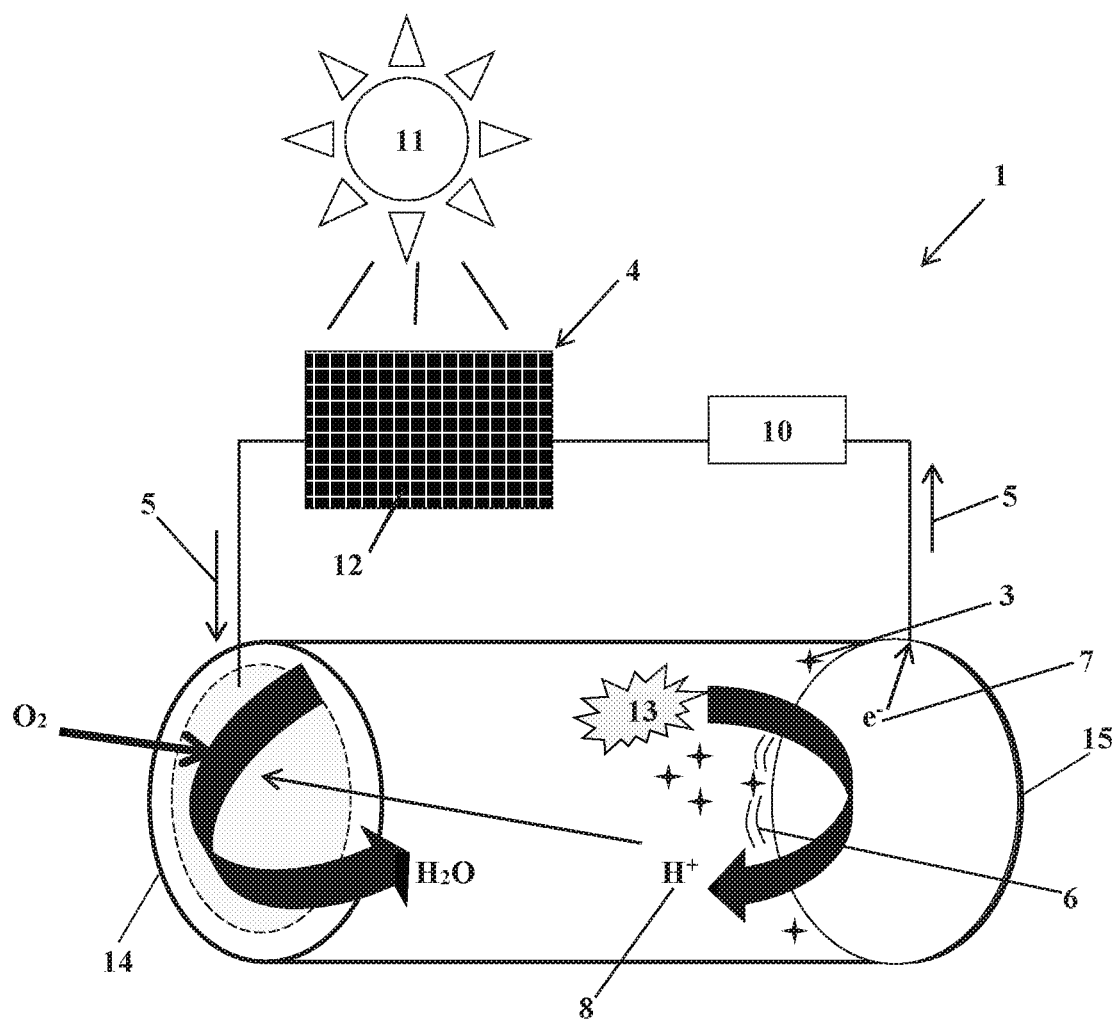
FIG. 3 shows a schematic representation of a non-limiting example of an advanced bioelectrochemical system.

A photo-active or semi-conducting material or device may be combined with a bioelectrochemical system by connecting the semi-conducting material and/or device in between the bioelectrochemical system anode and cathode, perhaps as shown in the non-limiting example in FIG. 3. A bioelectrochemical system may or may not have an external load (10) (such as a resistor). The semi-conducting material may include, but is not limited to, silicon solar cells, perovskite, rutile, anatase, sphalerite, goethite, metal oxides, mixed metal oxides, metal sulfides, metalloids, any combination thereof, or the like. The semi-conducting material may be irradiated by, but not limited to, light (11) such as visible or ultraviolet light, or the like. The light sources may be from, but not limited to, the sun or external lamps or the like.

Specifically, FIG. 3 provides a non-limiting example of a possible general design of an advanced bioelectrochemical system that may include a power source (4), such as but not limited to a source of light (11) onto a silicon solar cell (12), connected in between at least one anode (15) and a cathode (14) along with a load (10). A semi-conducting material and/or device (such as but not limited to a silicon solar cell) may be integrated with a bioelectrochemical system for oxidizing (perhaps at an anode vicinity) and reducing (at cathode vicinity) a pollutant in water, wastewater, or another environmental matrix. FIG. 3 is also a non-limiting example of a possible advanced bioelectrochemical system for in situ remediation of a polluted environmental matrix, where the anode of the bioelectrochemical system may be in direct contact with the surrounding environmental matrix and the semi-conducting material or device may be irradiated by light.

Figure 4:
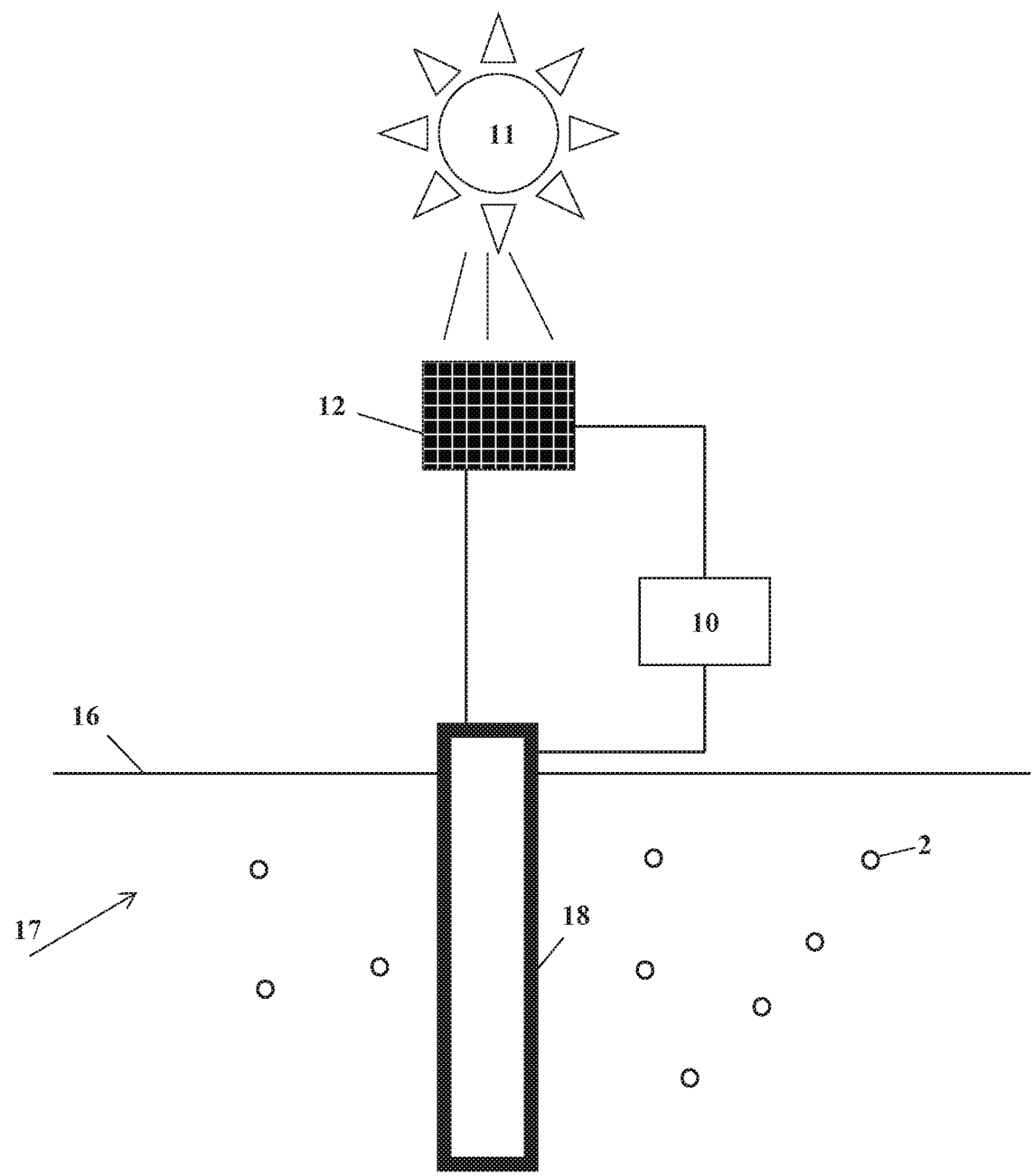
FIG. 4 shows a schematic representation of another non-limiting example of an advanced bioelectrochemical system.

FIG. 4 depicts a non-limiting system embodiment including a source of light (11), a silicon solar cell (12), a load (10), contaminants (2) in an environmental media (17), a ground surface (16), and a bioelectrochemical system (18) (which could include the anode and cathode system). This may apply for treatment of industrial or municipal wastewater, perhaps where an anode may be in direct contact with the wastewater, the cathode may be floating at the water-air interface, and a semi-conducting material or device may be irradiated by light.

Figure 5:
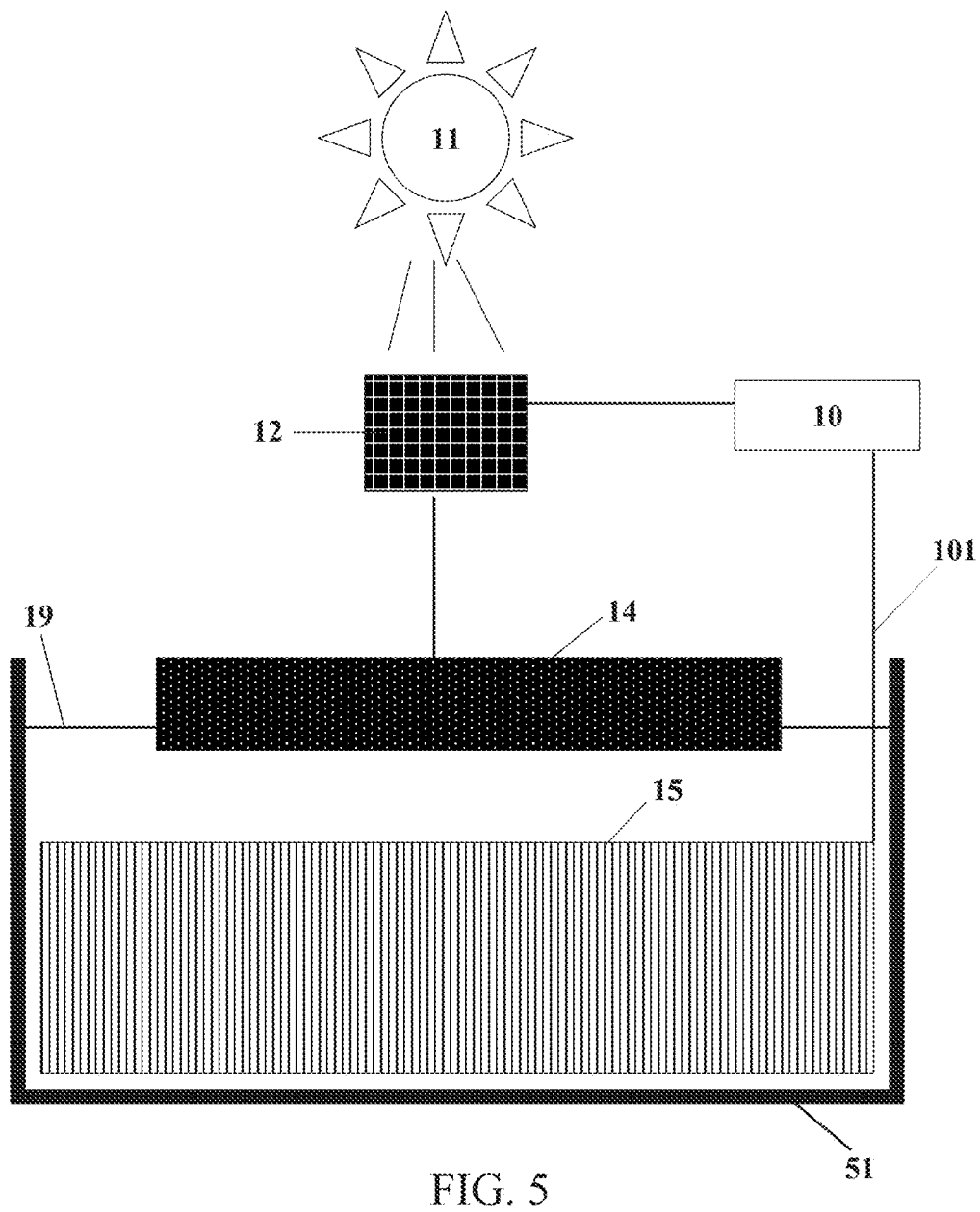
FIG. 5 shows a schematic representation of another non-limiting example of an advanced bioelectrochemical system.

FIG. 5 is a non-limiting example of a possible general design of a semi-conducting material and/or device (silicon solar cell) integrated with a bioelectrochemical system for treating industrial or municipal wastewater perhaps as an ex-situ treatment where the wastewater may be contained in a container (51). A power source, such as a source of light (11) with a semi-conducting material such as a silicon solar cell (12), may be included with an anode (15), a cathode (14), a load (10), showing a wastewater surface (19). A circuit (101) can provide a flow of electrons from an anode (15) to a load (10) to a semi-conducting material.

Figure 6:
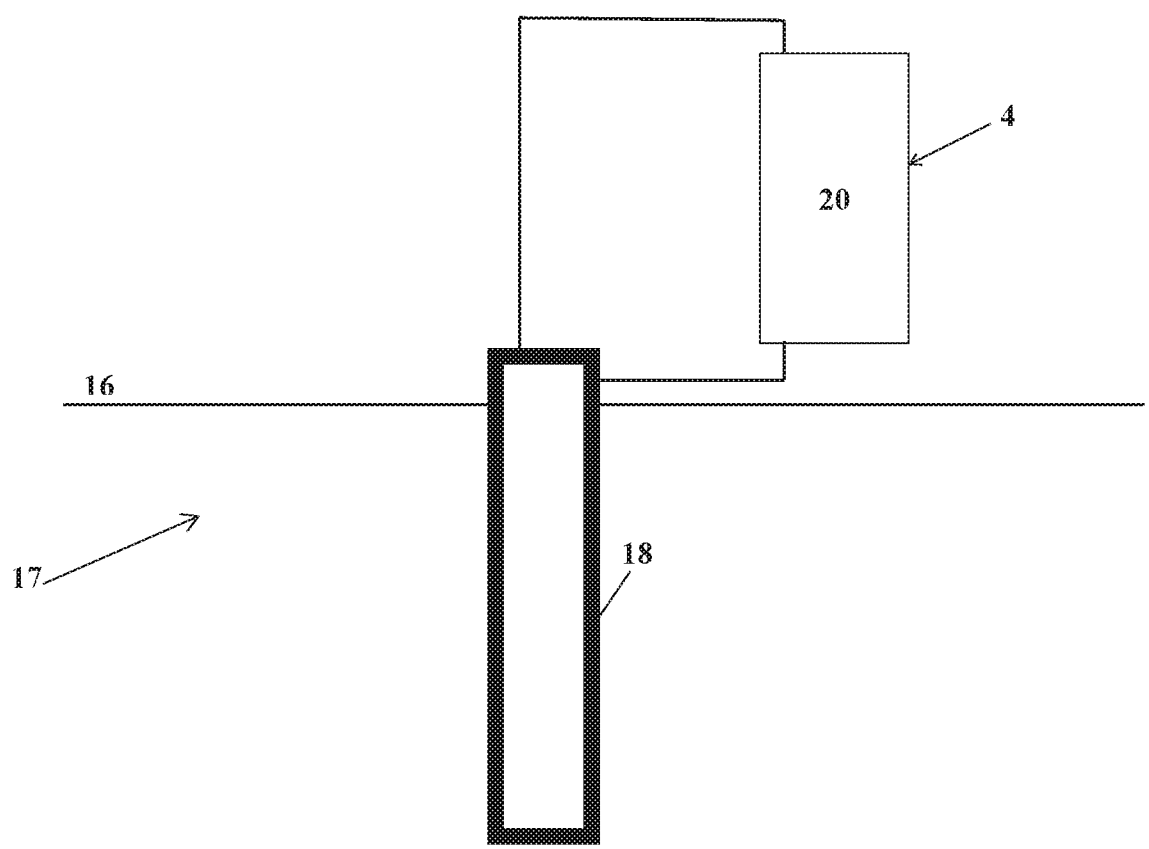
FIG. 6 shows a schematic representation of another non-limiting example of an advanced bioelectrochemical system.
Figure 7:
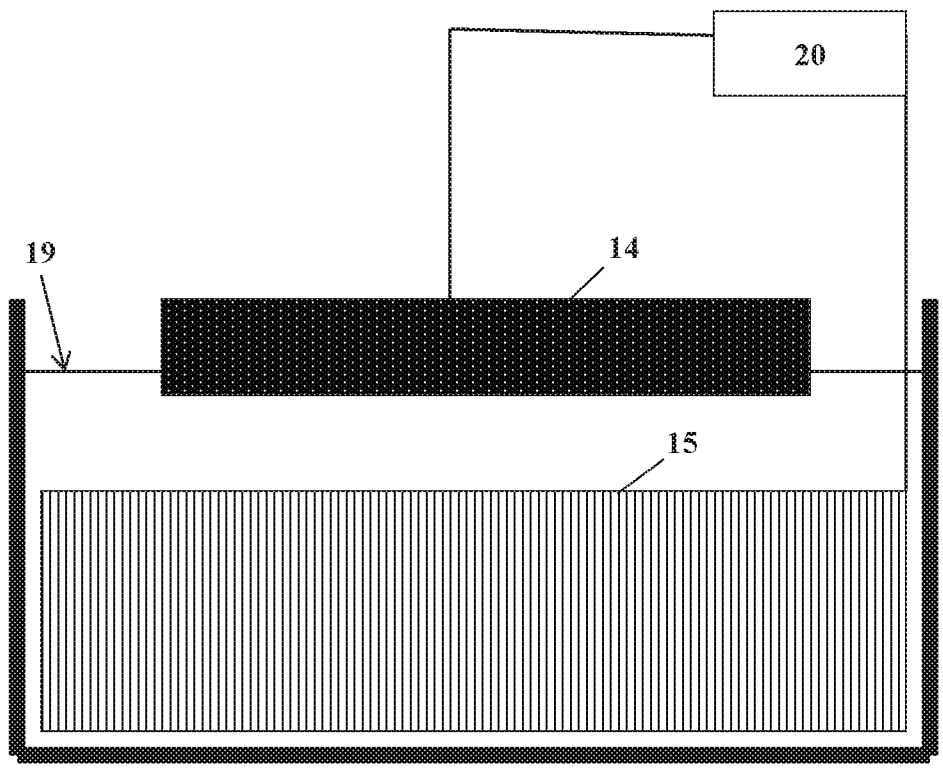
FIG. 7 shows a schematic representation of another non-limiting example of an advanced bioelectrochemical system.

In some embodiments, a power source (4) may be a battery. A battery may be connected to an anode. A battery may be a DC power supply, alkaline AAA, AA, D, 9-V, lithium ion, lead-acid batteries, and any combination thereof, or the like. A battery or DC power supply may enhance electron flow to the anode and may facilitate biofilm growth on the anode. By adding an external power source, the potential of the anode may increase relative to the matrix perhaps while driving electron flow from the anode to the cathode. For this to occur, electrons should be acquired from the media, thus, promoting electron transfer from microbial activity to an anode. Microbial growth can be electrochemically enhanced, therefore, a connection, perhaps temporary, of a power source to a bioelectrochemical system can initiate and may facilitate faster biofilm growth on the anode, perhaps resulting in decreased lag time in bioelectrochemical system performance in enhancing contaminant degradation. FIGS. 6 and 7 show examples of how batteries may be connected to bioelectrochemical systems. FIG. 6 depicts a non-limited example of an embodiment containing a battery (20), a ground surface (16), an environmental media (17) such as contaminated soil, sediments, groundwater, or the like, and a bioelectrochemical system (18). FIG. 7 depicts a non-limiting example of a wastewater treatment example design including a battery (20), a wastewater surface (19), a cathode (14), and an anode (15).

Figure 10:
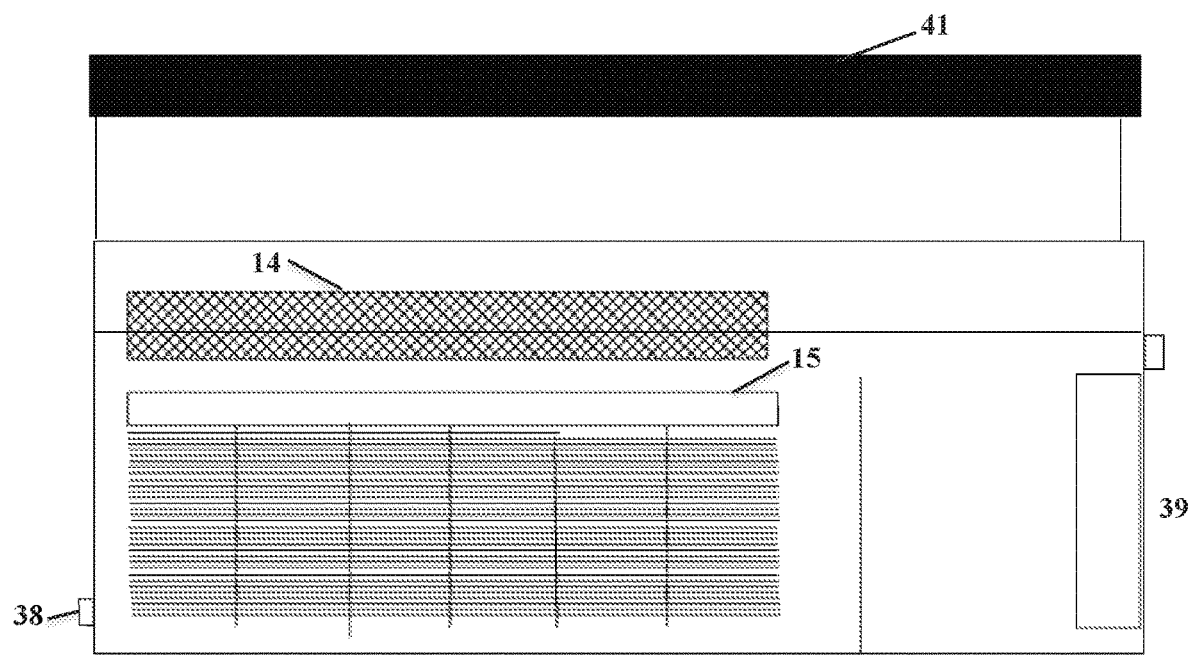
FIG. 10 shows a schematic representation of a non-limiting example of a side view of a photo-bioelectrochemical system.
Figure 11:
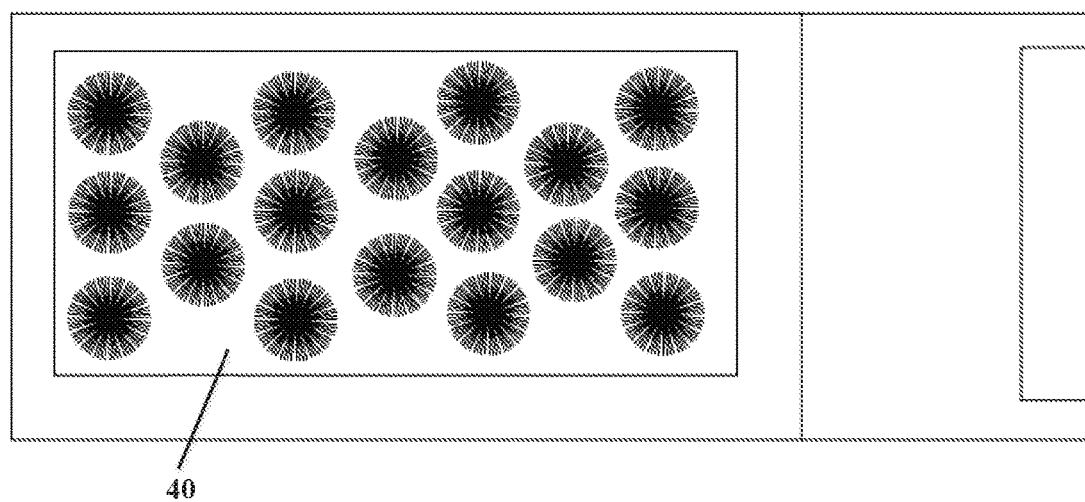
FIG. 11 shows a schematic representation of a non-limiting example of a top view of a photo-bioelectrochemical system without a cathode or solar roof.
Figure 12:
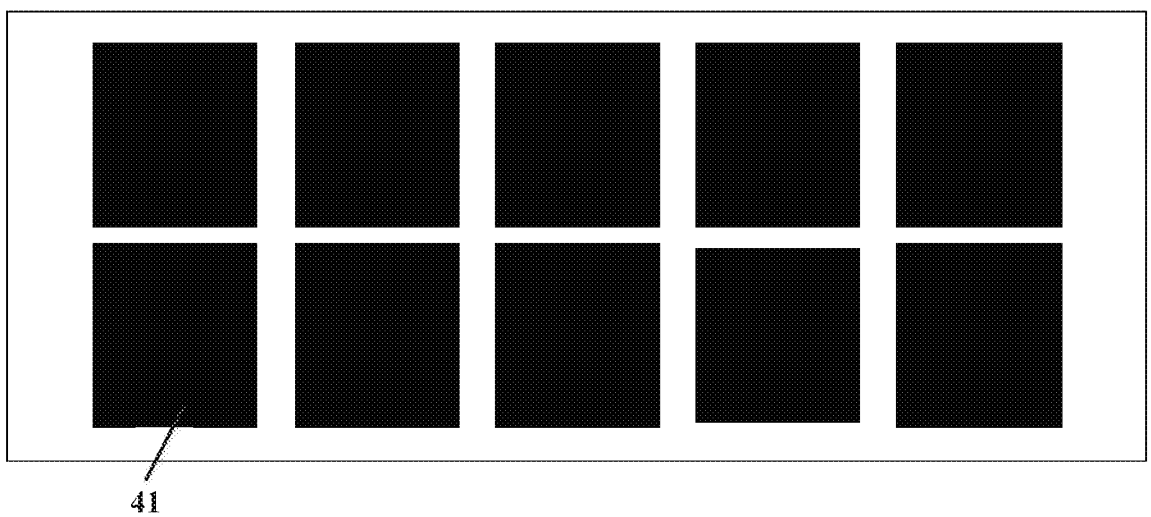
FIG. 12 shows a schematic representation of a non-limiting example of a top view of a photo-bioelectrochemical system with a solar roof.

FIGS. 10-12 provide non-limiting examples of an advanced bioelectrochemical system using a solar panel. FIG. 10 depicts a side view of a system which includes an input (38), a cathode (14), an anode (15), a membrane (39) and a solar panel (41). FIG. 11 depicts a top view of an example system without showing a cathode or solar roof so that the anode network (40) is visible. This is an example of use of a plurality of anodes. FIG. 12 depicts a top view of an example system showing a solar roof and several solar panels (41).

Embodiments of the present invention may be used to provide electrical power to other devices or be combined with energy recovery systems. The other devices or energy recovery systems may be connected as the load. The present invention, in some embodiments, may be combined with other environmental remediation, wastewater treatment, air pollution control, or other environmental treatment or beneficiation processes.

In some embodiments of the present invention, an environmental media may be wastewater. An anode may be in direct contact with an environmental media, such as with wastewater, and a cathode may be a wicking air cathode or the like. Embodiments of the present invention may be integrated with an aeration treatment system used to treat wastewater or may even replace an aeration treatment system for wastewater treatments.

Figure 8:
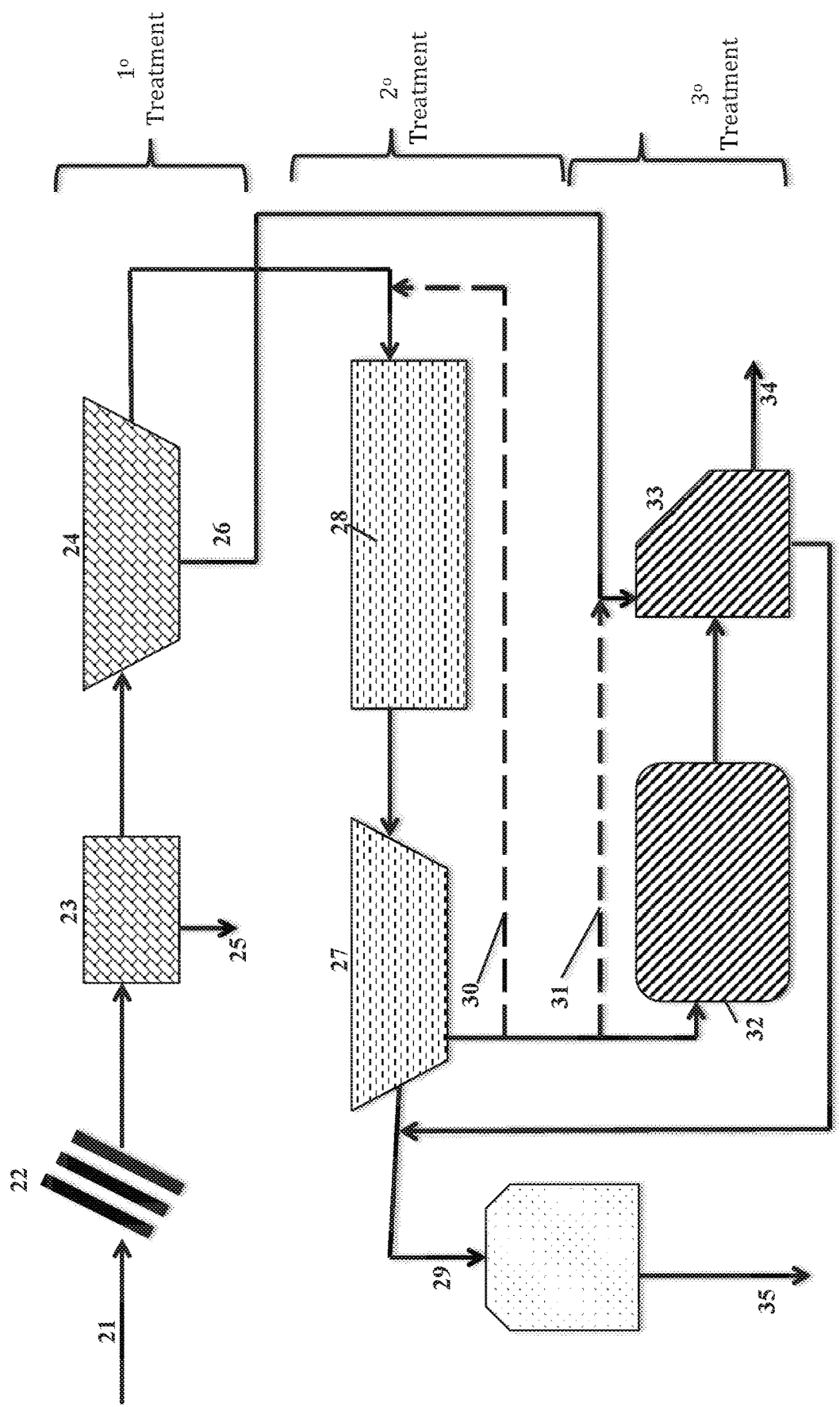
FIG. 8 shows a schematic representation of a non-limiting example of an advanced bioelectrochemical system integrated with a wastewater treatment system.

A non-limiting example of an aeration-based wastewater treatment process is shown in FIG. 8. FIG. 8 depicts a system which includes a wastewater influent (21), bar screen (22), grit chamber (23), primary clarifier (24), grit (25), primary sludge (26), secondary clarifier (27), aeration basin/tank (28), disinfection (29), return activated sludge (30), waste activated sludge (31), anaerobic digester (32), dewatering (33), sludge or beneficial use (34), and discharge to environment (35). The aeration basin/tank may use oxygen as a terminal electron acceptor from the air pumped and sparged into wastewater to enhance aerobic bacteria activity to degrade organic compounds in the form of chemical oxygen demand (COD). High growth rate of bacteria may result from the aeration, which may produce high amounts of sludge that has to be further processed before disposal. Sludge handling is a major cost for wastewater treatment. Also, the aeration itself consumes high amounts of energy, which may represent the largest cost fraction for wastewater treatment. Furthermore, the requirement for sludge handling may add to the land requirements for wastewater treatment. Embodiments of the present invention may provide a reduction of sludge in a wastewater treatment system. This may provide reducing an amount of sludge in wastewater treatment systems as compared to an amount of sludge (26) generated in a standard aeration treatment system for wastewater. For example, up to about 80% of sludge may be reduced in a wastewater treatment system by utilizing an advanced bioelectrochemical system.

Figure 9:
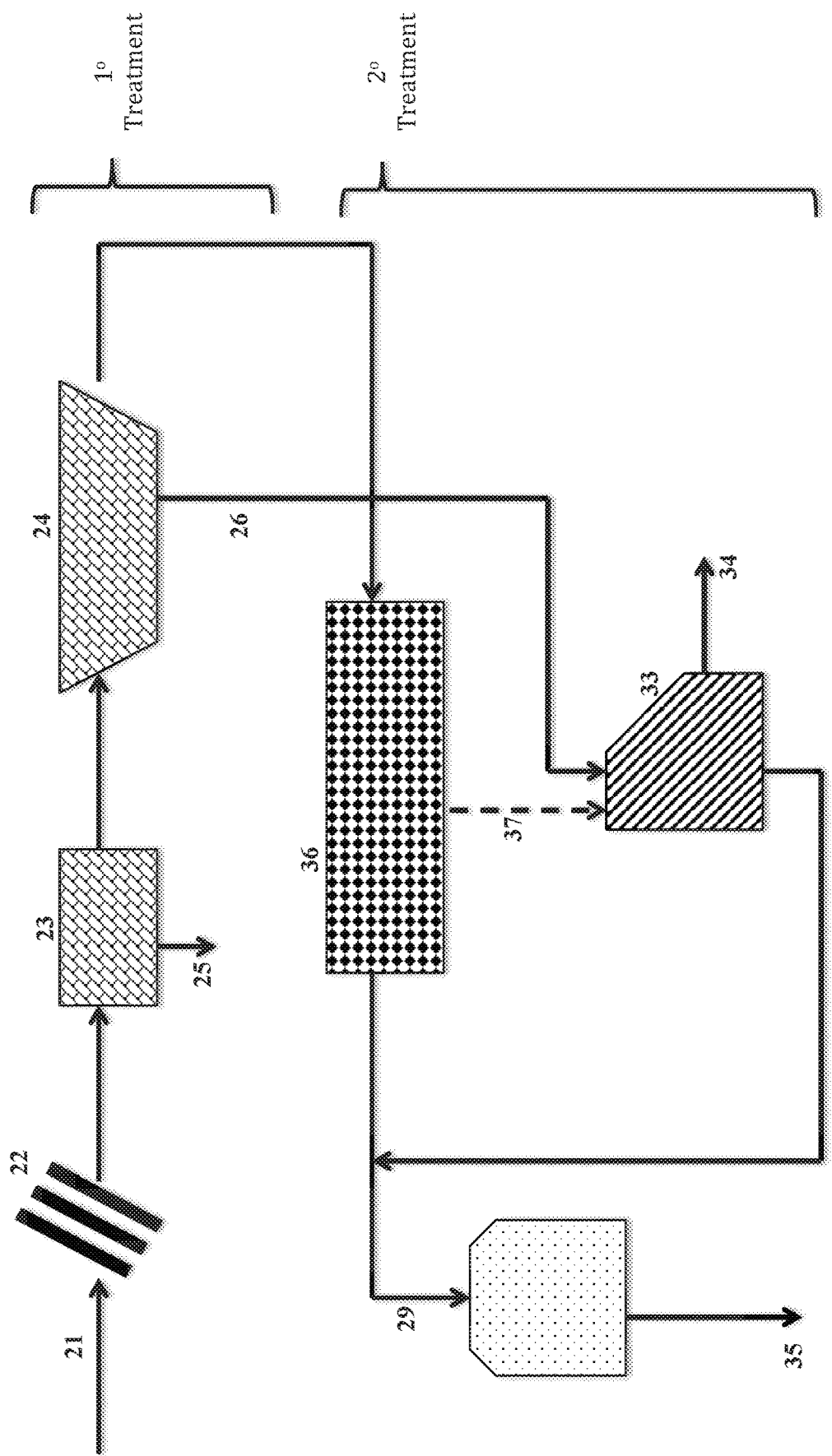
FIG. 9 shows a schematic representation of another non-limiting example of an advanced bioelectrochemical system integrated with a wastewater treatment system.

An advanced bioelectrochemical system itself may require no aeration for enhancing microbial degradation of COD in wastewater. This may eliminate the need for aeration in a wastewater treatment plant, perhaps by replacing the aeration basin/tank in a wastewater treatment process. The replacement can be achieved if the system performs as well or better than aeration in removing COD and other regulated nutrients in the wastewater. If under certain circumstances an advanced bioelectrochemical system performs less effectively than aeration, it may also partially replace an aeration basin, where aeration may operate alongside with an advanced bioelectrochemical system (perhaps installed in the aeration basin) but aeration may be significantly reduced. Both scenarios, as shown may result in further reductions of other process requirements. This may be due to a significant reduction in an amount of sludge production, which may then reduce a requirement for sludge handling. The reduction of other treatment processes may result in a reduction of space requirements. FIG. 9 includes a non-limiting example of a wastewater treatment system with an integrated advanced bioelectrochemical system showing a wastewater influent (21), bar screen (22), grit chamber (23), primary clarifier (24), grit (25), primary sludge (26), disinfection (29), dewatering (33), sludge or beneficial use (34), and discharge to environment (35), an advanced bioelectrochemical system (36), and sludge (37).

As mentioned above, sludge may be a key issue to the wastewater treatment industry. Most of sludge may be generated during the aeration step, in which (aerobic) biomass grows fast due to high oxygen content. Mixed with other suspended solids, sludge is produced. A minor portion of sludge (perhaps mainly biomass) may be returned for reuse, but the majority of it should be removed, dried, and disposed. Sludge may be categorized into different classes, and only Class A sludge can be converted to value-added products. Classes B and C sludge can be essentially waste material. While an aeration step may consume about 30% to about 50% of a typical wastewater treatment energy, sludge treatment may consume another big portion. In addition, the transportation and even disposal of sludge can add a significant cost to the total treatment cost of a wastewater treatment. However, with a non-aeration option such as an advanced bioelectrochemical system as discussed herein, biomass growth and sludge accumulation/deposit may be significantly reduced. Therefore, there is less amount of sludge generated and less frequency of treating and disposing of the sludge.

Figure 13:
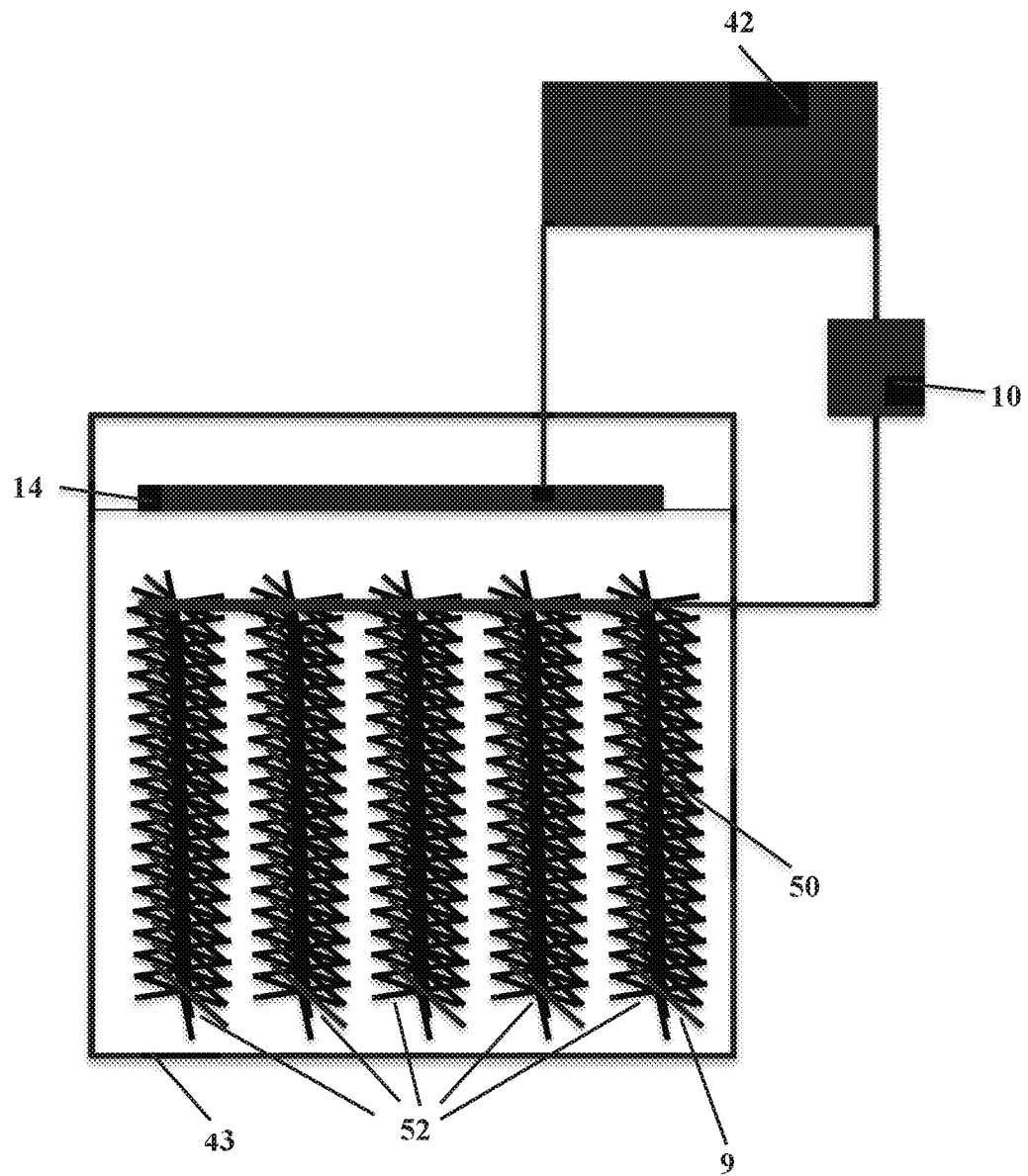
FIG. 13 shows a schematic representation of another non-limiting example of an advanced bioelectrochemical system with a plurality of anodes.

Embodiments of the present invention may provide at least one anode or may have a plurality of anodes. A bioelectrochemical system that is enhanced by an external power source may have anodes that are stainless-steel, may have bristles, and may even be column shaped. In some embodiments, anodes may be installed vertically and/or perhaps even in rows. In embodiments, an anode may be constructed from stainless steel with bristles or similar structures for maximum surface area. Stainless steel anodes may be column shaped and may be installed vertically perhaps in rows perhaps to maximize radii of influence and even minimize sludge accumulation. To maximize surficial biofilm growth, a columnar anode may consist of fine bristles, which may maximize electron transfer and even the facilitation of redox reactions. FIG. 13 depicts a non-limiting example of an advanced bioelectrochemical system using a plurality of anodes showing an external power source (42), a load (10), a cathode (14), a side view of column shaped anodes (50) having bristles (9) placed in rows (52), in a tank (43) which can either be an aeration basin/tank or a separate basin/tank or the like.

Redox reactions that may occur at the columnar anodes may result in contaminant degradation in complex compound mixtures in the environmental matrix (e.g., wastewater). Since biofilm growth on stainless steel is difficult, the use of external power source can enhance and even increase the rate of biofilm growth on such surfaces, where the biofilm can be an important component of the system to enhancing contaminant degradation. Other conductive materials with similar surfaces can be used as anodes in such a system.

A bioelectrochemical treatment system enhanced by an external power source may be designed and has been demonstrated to treat relatively recalcitrant compounds (e.g., hydrocarbons), large-molecule compounds, and complex mixtures of compounds that contribute to chemical oxygen demand (or even biological oxygen demand). These mixtures can include complex fats, proteins, carbohydrates, hydrocarbons, halogenated compounds, and inorganic compounds. From the demonstrated enhanced degradation of these mixtures of compounds, it is reasonable that this system can enhance the degradation of other simpler contaminant/compound solutions or mixtures.

EXAMPLE

To determine the effectiveness of a photocatalyzed bioelectrochemical system for wastewater treatment, laboratory-scale wastewater treatment tests were setup, which consisted of three different treatment reactors:
  Aeration (simulating conventional aeration basin)
  Bioelectrochemical (BEC) system
  Photocatalyzed bioelectrochemical (PBEC) system (a solar cell connected in line between the resistor and cathode using a plurality of stainless-steel column shaped anodes placed vertically in rows in the wastewater)

Figure 2:
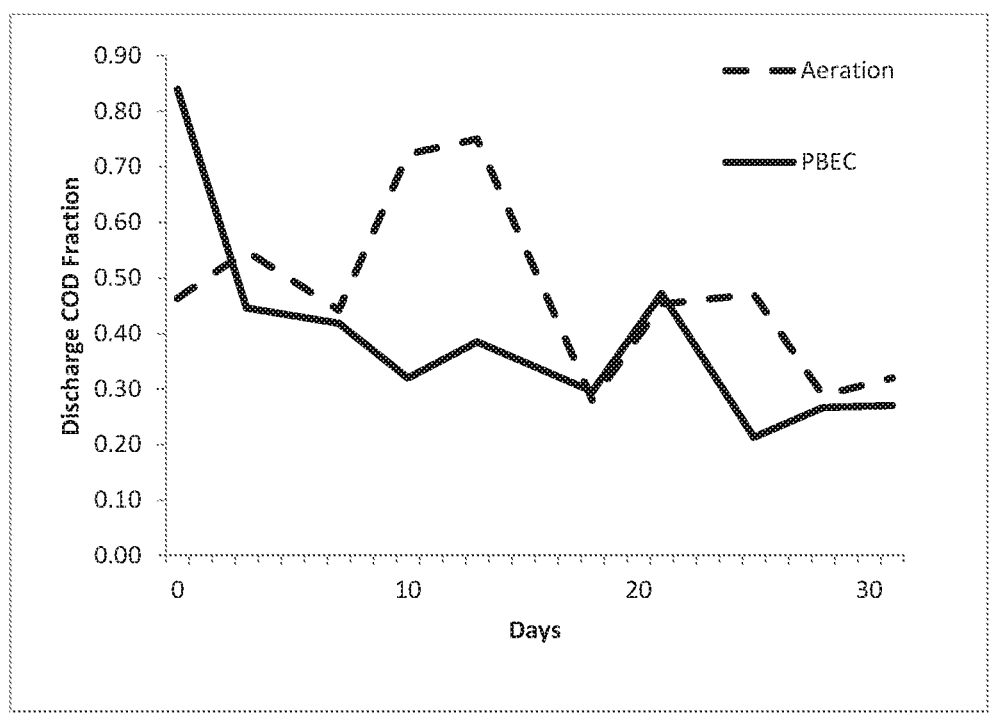
FIG. 2 shows a graph of the chemical oxygen demand concentrations in wastewater that was treated in laboratory-scale reactors for only the aeration and photo-bioelectrochemical systems comparison over 30 days.

The pumping rate of synthetic sewage was set to give a hydraulic retention time (HRT) of 12 hours. The laboratory-scale wastewater treatment tests ran for 57 days, and the following results were observed. FIG. 1 shows the results of the three reactors over 50 days and FIG. 2 shows the results of FIG. 1 with just the aeration and PBEC comparison over 30 days. The results show that:
  The BEC system COD removal performance was within 18% of that of the aeration process
  The integration of photocatalysis in the PBEC system further improved the COD removal performance, where the performance was mostly 8-55% greater than that of the aeration process.

As can be easily understood from the foregoing, the basic concepts of the present invention may be embodied in a variety of ways. It involves both remediating pollutants techniques as well as devices to accomplish the appropriate pollutants remediator. In this application, the remediating pollutants techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "reducer" should be understood to encompass disclosure of the act of "reducing"—whether explicitly discussed or not—and, conversely, were there effectively disclosure of the act of "reducing", such a disclosure should be understood to encompass disclosure of a "reducer" and even a "means for reducing." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the remediation devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for enhancing biodegradation of contaminants comprising the steps of:
   providing a bioelectrochemical contaminant biodegradation system comprising:
      an anode within an environmental media having a contaminant;
      a microbial population near said anode in said environmental media;
      a cathode;
      system generated electrons and protons near said anode from oxidation reactions and metabolism reactions of said microbial population with said contaminant; and
      a circuit providing a flow of system generated electrons collected from said environmental media near said anode to said cathode;
   connecting a photocatalytic device between said anode and said cathode, wherein said photocatalytic device comprises a semi-conducting material;
   creating photochemical-reactions in said semi-conducting material by exposing said semi-conducting material to a light source which creates electron-hole pairs by releasing photoelectrons from said semi-conducting material;
   directing said photoelectrons released from said semi-conducting material to said cathode;
   utilizing said photoelectrons at said cathode by combining said photoelectrons with said protons and oxygen to form water;
   filling said electron-hole pairs in said semi-conducting material of said photocatalytic device with said system generated electrons from said anode;
   speeding up an electron transfer between said anode to said cathode with said second flow of system generated electrons;
   increasing biodegradation of at least some of said contaminant with said sped up electron transfer;
   increasing oxidation near said anode; and
   generating more of said system generated electrons and protons near said anode to continue said electron transfer between said anode and said cathode.

2. The method of claim 1 wherein said contaminant is chosen from petroleum hydrocarbons, volatile organic compounds, semi-volatile organic compounds, ethers, fuel oxygenates, ketones, alcohols, amines, amides, monoaromatic compounds, chlorinated solvents, halogenated hydrocarbons, endocrine disrupting compounds, dioxanes, dioxins, polycyclic aromatic hydrocarbons, polychlorinated biphenyls, chlorobenzenes, phenols, chlorophenols, perfluorinated compounds, chemical oxygen demand, heavy metals, arsenic, selenium, nitrate, perchlorate, carbon dioxide, sulfur oxides, nitrogen oxides, and any combination thereof.

3. The method of claim 1 wherein said environmental media is chosen from water, soil, sediment, groundwater, wastewater, surface water, gravel, coal, peat, fractured rock, air, flue gas, and any combination thereof.

4. The method of claim 1 wherein said semi-conducting material is chosen from silicon solar cells, perovskite, rutile, anatase, sphalerite, goethite, metal oxides, mixed metal oxides, metal sulfides, metalloids, and any combination thereof.

5. The method of claim 1 and further comprising a step of providing a power source connected to said anode.

6. The method of claim 5 wherein said step of providing a power source comprises the step of continuously providing power to said anode.

7. The method of claim 6 wherein said step of continuously providing power to said comprises a power source chosen from a solar power source coupled with a battery, a solar power source coupled with a transformer, a solar power source coupled with a rectifier, a solar power source coupled with a direct current power supplier, a wind power source coupled with a battery, a wind power source coupled with a transformer, a wind power source coupled with a rectifier, a wind power source coupled with a direct current power supplier, and any combination thereof.

8. The method of claim 1 wherein said environmental media comprises wastewater.

9. The method of claim 1 and further comprising the step of maximizing electron transfer at said anode.

10. The method of claim 1 wherein said anode comprises a stainless-steel anode.

11. The method of claim 1 wherein said anode comprises an anode with bristles.

12. The method of claim 1 wherein said anode comprises a column shaped anode.

13. The method of claim 1 and further comprising the step of installing a plurality of anodes vertically in said environmental media.

14. The method of claim 13 wherein said step of installing a plurality of anodes vertically in said environmental media comprises the step of installing said plurality of anodes vertically in rows in said environmental media.

15. The method of claim 9 wherein said step of maximizing electron transfer at said anode comprises the step of providing a plurality of stainless-steel, column shaped anodes with bristles which are vertically installed in said environmental media.

16. The method of claim 8 and further comprising the step of utilizing an aeration treatment system for wastewater with said anode, said cathode and said power source connected to said anode.

17. The method of claim 5 and further comprising the step of connecting said power source to said anode for a time chosen from about one minute to about one month.

* * * * *